United States Patent

[11] 3,583,372

[72] Inventor Heinrich Hoffmann
    Stuttgart-Geroksruhe, Germany
[21] Appl. No. 834,772
[22] Filed June 19, 1969
[45] Patented June 8, 1971
[73] Assignee Daimler-Benz Aktiengesellschaft
    Stuttgart-Unterturkheim, Germany
[32] Priority June 21, 1968
[33] Germany
[31] P 17 51 576.3-13

[54] AIR COMPRESSING AUTOIGNITING INJECTION-TYPE INTERNAL COMBUSTION ENGINE WITH PRECHAMBER
6 Claims, 1 Drawing Fig.
[52] U.S. Cl. ................................................. 123/30D,
    123/32, 123/32C
[51] Int. Cl. ...................................................... F02b 19/00
[50] Field of Search ............................................. 123/30,
    30.2, 30.21, 32

[56] References Cited
UNITED STATES PATENTS
| | | | |
|---|---|---|---|
| 1,263,986 | 4/1918 | Wygodsky .................... | 123/32 |
| 2,658,487 | 11/1953 | Basabe ......................... | 123/32 |
| 3,386,422 | 6/1968 | Eyzat ............................ | 123/32 |

Primary Examiner—Laurence M. Goodridge
Attorney—Craig, Antonelli, Stewart and Hill ABSTRACT: An air-compressing autoigniting injection-type internal combustion engine in which fuel is injected from an injection nozzle arranged in the prechamber in the direction opposite the air flowing from the cylinder space into the prechamber in such a manner that a portion of the fuel jet is distributed by the air and another portion of the fuel is distributed along the walls of the discharge channels from which it is detached in vapor form by the inflowing combustion air and by the overflowing charge; the piston top is provided with an annularly shaped combustion space recess enclosing a crown portion forming a dome extending into the discharge channel so as to form an annular discharge gap having a cross section considerably smaller than the discharge aperture.

PATENTED JUN 8 1971 3,583,372
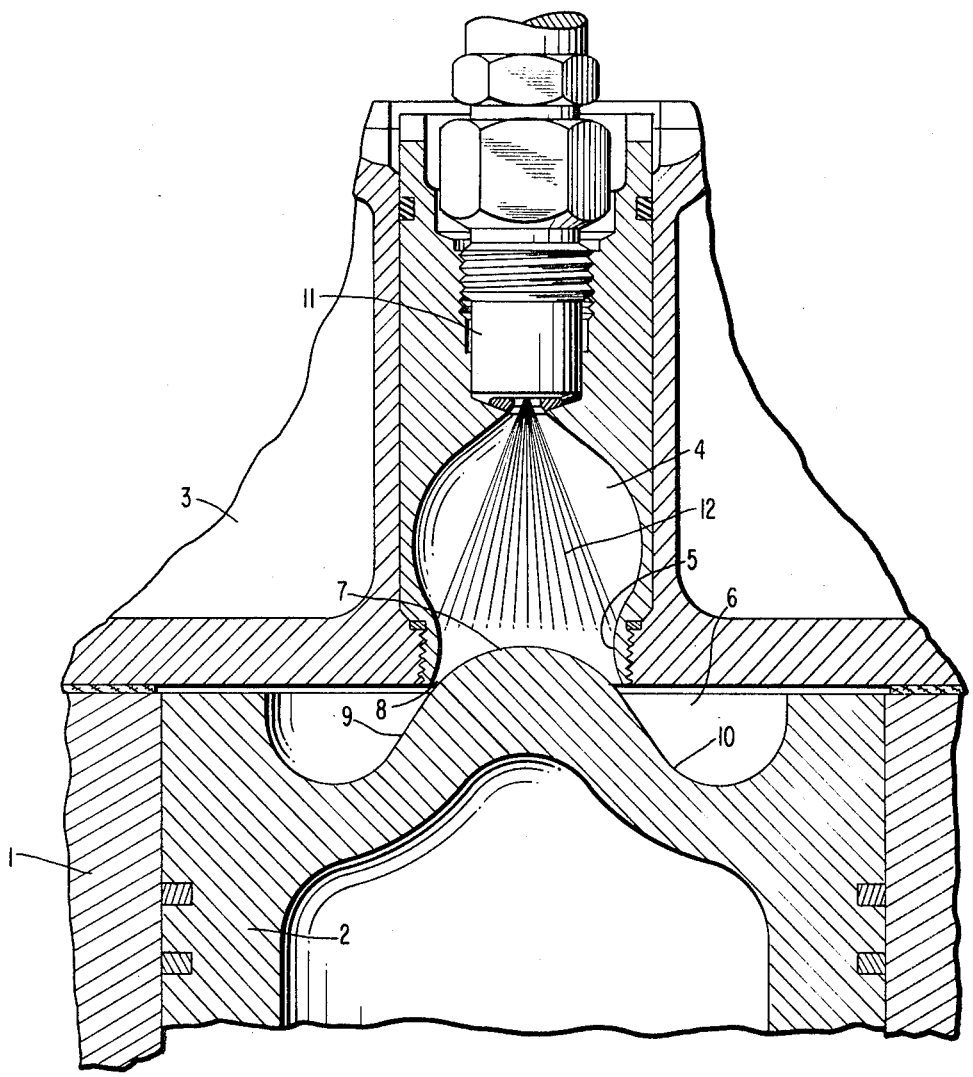
INVENTOR
HEINRICH HOFFMANN
BY
Craig, Antonelli, Stewart & Hill
ATTORNEYS

AIR COMPRESSING AUTOIGNITING INJECTION-TYPE INTERNAL COMBUSTION ENGINE WITH PRECHAMBER

The present invention relates to an air-compressing, autoigniting injection-type internal combustion engine with a prechamber essentially axially arranged in the cylinder head and having a Venturi-shaped discharge channel slightly converging in the direction toward the cylinder space and with combustion air inflowing rotatingly about the cylinder axis which is displaced during the compression stroke with increased angular velocity into the prechamber and continues to rotate therein, whereby the fuel is injected opposite the combustion air rotatingly flowing into the prechamber against the walls of the discharge channel so that injected fuel and inflowing air mutually cross and as a result of the corresponding intensive tearing up of the fuel jet, a considerable air-distributed fuel portion results whereas the wall-distributed fuel portion is distributed filmlike by the air rotatingly displaced into the prechamber and by the charge again rotatingly flowing out of the prechamber, is detached in vapor form, is mixed with the air and is combusted.

Whereas the heretofore customary prechamber Diesel engines exhibited still the shortcoming of considerable throttle losses as a result of the displacement process between cylinder space and prechamber, inadequate air utilization and poor smoke values, the internal combustion engines as specified above enable a smooth running, good air utilization and low smoke values owing to the fuel portion applied wall-distributed in proximity to the discharge in relation to the prechamber, redetached, evaporated and combusted, whereby even in the case that the prechamber should accommodate nearly the entire compression volume of the internal combustion engine, also the throttle losses were reduced to a minimum by the Venturi shape and the large internal width of the discharge channel of the prechamber. However, since it is not always possible for space reasons to accommodate the entire compression volume and therewith the entire charge in the prechamber arranged in the cylinder head, a portion of the combustion space has to be accommodated in such cases in a corresponding piston recess.

The present invention is concerned with the task to so construct the internal combustion engine provided in addition to a prechamber with a piston recess, that the advantages as regards mixture formation and combustion are not only preserved but are further improved to the extent possible.

The underlying problems are solved in accordance with the present invention in that the working piston of the internal combustion engine forms a ring-shaped combustion space recess and the piston top portion enclosed thereby forms a dome extending into the prechamber in the compression end position of the working piston while leaving free an essentially smaller annular gap with respect to the discharge aperture of the prechamber.

It is achieved by the constriction of the inlet cross section of the prechamber by the piston approaching its compression dead center point that the only relative low velocity, as such, of the combustion air displaced into the prechamber within the area of the aforementioned top dead center position which is utilized for the mixture formation, is increased.

According to a preferred construction of the present invention, the combustion space recess has an approximately semispherically shaped annular cross section whereas the dome of the working piston passes over with an approximately conically shaped external sidewall tangentially into the inner sidewall of the combustion space recess. It is achieved thereby that the gas overflowing out of the prechamber through the annular gap into the combustion space recess, flows along the conically shaped inner sidewalls of the recess into the same and therewith rotates in the recess in a toroidal swirl or vortex approximately about the cross-sectional axis of the annular recess whereby an especially intensive mixing of the mixture with the air present in the combustion space recess is achieved.

Accordingly, it is an object of the present invention to provide an air-compressing, autoigniting, injection-type internal combustion engine which avoids the aforementioned shortcomings and drawbacks encountered in the prior art.

Another object of the present invention resides in an air-compressing, autoigniting, injection-type internal combustion engine in which the mixture formation and combustion is improved.

A further object of the present invention resides in a Diesel engine of the aforementioned type in which the velocity of the combustion air displaced into the prechamber within the area of the upper dead center position of the piston is increased as compared to that attainable heretofore.

Still a further object of the present invention resides in an internal combustion engine of the type described above in which is achieved a particularly intensive mixing of the mixture from the prechamber with the air present in a combustion space recess of the piston.

These and further objects, features and advantages of the present invention will become more obvious from the following description when taken in connection with the accompanying drawing which shows, for purposes of illustration only, one embodiment in accordance with the present invention, and wherein:

The single FIGURE is a schematic axial, partial cross-sectional view through a working cylinder of an internal combustion engine having a combustion space arrangement in accordance with the present invention.

Referring now to the single FIGURE of the drawing, the prechamber Diesel internal combustion engine illustrated therein includes in its working cylinder 1, a working piston 2 which conventionally reciprocates therein and which during its work stroke transmits the pressure forces exerted thereon as driving torque to the crankshaft of the internal combustion engine rotatingly driven thereby.

An axially symmetrical prechamber 4 of essentially approximately onionlike shape is arranged in the cylinder head 3 of the internal combustion engine which is provided with a Venturi-shaped discharge channel 5 slightly narrowing or constricted in the direction toward the cylinder space. Consequently, only minimal throttle losses can arise during the displacement into the prechamber of the combustion air, which flows into the cylinder space with a rotating movement about the cylinder axis realized by means (not illustrated) of conventional construction, and also during the overflow of the charge out of the prechamber 4 into the cylinder space.

The working piston 2 is provided with an annularly shaped combustion space recess 6, and the piston top portion enclosed thereby is provided with a dome 7 axially extending slightly into the prechamber 4 in the illustrated compression end position of the working piston 2 so that in the compression end position of the working piston 2 piston 2, only a considerably smaller annular gap 8 remains between the discharge channel 5 and the dome 7 compared to the discharge aperture of the prechamber 4. As to the rest, the combustion space recess 6 has an approximately hemispherically shaped annular cross section whereas the dome 7, rounded off at its axially highest place, passes over with an approximately conically shaped sidewall 9 tangentially into the inner sidewall 10 of the combustion space recess 6.

An injection nozzle 11 axially arranged in the usual manner in the prechamber 4 is constructed as conically shaped nozzle, i.e., as nozzle producing a hollow jet 12 of conical shell shape directed against the restricted portion of the discharge channel 5.

During the operation of the described internal combustion engine, the combustion air flowing with a swirling movement about the cylinder axis into the prechamber 4 to a predominant extent with only a small with only small throttle losses, effects not only a good scavenging of the prechamber but crosses during its inflow simultaneously the conically shaped hollow jet 12 of the injection nozzle 11 whereby a considerable portion of the injected fuel is rapidly torn up and prepared and therewith is ignited with only slight ignition delay and brings slight ignition delay and brings about flat pressure rises. The wall application of the fuel portion reaching the walls of the discharge channel 5 in proximity to the discharge results also in low pressure rises and in a smooth running, good air efficiency and low smoke values.

The velocity of the combustion air flowing into the prechamber 4 which as such is only relatively small within the area of the top dead center position of the working piston 2, is considerably increased by the annular gap 8 formed in the compression end position of the working piston 2 between the dome 7 of the working piston 2 and the discharge channel 5 of the prechamber 4, which annular gap 8 is formed during the compression stroke only shortly prior to reaching the compression top dead center position of the working piston 2, whence in the described internal combustion engine also in this top dead center position area a considerable air velocity remains preserved in the discharge channel 5 near the walls thereof which improves and accelerates the redetachment of the fuel applied thereat and the mixture formation. The mixture subsequently flowing out of the prechamber 4 enters approximately tangentially into the annularly shaped combustion space recess 6 near the inner sidewall 9 and thus leads to a toroidal turbulence in the recess which assures an intensive mixing of the mixture with the air present in the combustion space recess. The combustion space and injection arrangement of the present invention thus assures an extraordinarily complete mixture preparation of the injected fuel, a correspondingly favorable air efficiency and particularly low smoke values.

While I have shown and described only one embodiment in accordance with the present invention, it is understood understood that the same is not limited thereto but is susceptible of numerous changes and modifications as known to a person skilled in the art. For example, even though the described application of the wall-distributed fuel against the walls of the discharge channel is preferred by means of a nozzle producing a conically shaped shell of a jet, it is also feasible within the purview of this invention that the fuel application against the walls of the combustion space recess can be realized in a direction intersected by the inflowing air stream, also by a different injection arrangement in a manner still advantageous with respect to the present state of the art. Consequently, I do not wish to be limited to the details shown and described herein but intend to cover all such changes and modifications as are within the scope of those skilled in the art.

I claim:

1. An air-compressing, autoigniting, injection type internal combustion engine with a prechamber means arranged essentially axially in the cylinder head means and having a discharge channel means constricted in relation to the maximum cross section of the prechamber means, which includes a working piston having a substantially annularly shaped combustion space recess means and a domelike portion substantially enclosed by said annularly shaped combustion space recess means and extending in the compression end position of the piston into the prechamber means while leaving free an annular gap that is considerably smaller than the discharge aperture of the discharge channel means, means for obtaining an inflowing combustion air rotating substantially about the cylinder axis and injection nozzle means arranged at the end of the prechamber means opposite the discharge channel means for injection an essentially conical jet into the prechamber means in the direction toward the discharge channel means, characterized in that the prechamber means includes a substantially Venturi-shaped, only slightly constricted discharge channel means, and in that the injection nozzle mean injects a hollow jet of substantially conical shell shape against the walls of the discharge channel means opposite the combustion air rotating by inflowing into the prechamber means so that the injected fuel and the inflowing combustion air cross each other and a considerable air-distributed fuel component results as a result of the correspondingly intensive tearing up of the fuel while the wall-distributed fuel component is distributed filmlike by the air rotatingly displaced into the prechamber means and by the charge again rotatingly flowing our of the prechamber means, is detacted in vapor form, is mixed with the combustion air and is thereafter combusted.

2. An internal combustion engine according to claim 1, characterized in that the combustion space recess means has an approximately hemispherically shaped annular cross section, and the domelike portion passes over with an approximately conically shaped sidewall tangentially into the inner sidewall of the combustion space recess means.

3. An internal combustion engine according to claim 2, characterized in that the Venturi-shaped discharge channel means is formed by wall portions having a continuously curved convex configuration as viewed in cross section which adjoin substantially tangentially the walls of the prechamber means.

4. An internal combustion engine according to claim 3, characterized in that said prechamber means is of approximately onionlike shape, and in that the hollow conical jet of the fuel is injected substantially within the area of the discharge channel means slightly on the side of the prechamber means in relation to its smallest cross section.

5. An internal combustion engine according to claim 1, characterized in that the Venturi-shaped discharge channel means is formed by wall portions having a continuously curved convex configuration as viewed in cross section which adjoin substantially tangentially the walls of the prechamber means.

6. An internal combustion engine according to claim 5, characterized in that said prechamber means is of approximately onionlike shape, and in that the hollow conical jet of the fuel is injected substantially within the area of the discharge channel means slightly on the side of the prechamber means in relation to its smallest cross section.